(12) United States Patent
Kizu et al.

(10) Patent No.: US 12,352,667 B2
(45) Date of Patent: Jul. 8, 2025

(54) SYNCHRONIZATION DEVICE AND STORAGE MEDIUM

(71) Applicant: Mitsubishi Electric Corporation, Tokyo (JP)

(72) Inventors: Yuichi Kizu, Tokyo (JP); Takashi Kai, Tokyo (JP); Hiroyuki Sekiguchi, Tokyo (JP); Hidetoshi Ikeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 281 days.

(21) Appl. No.: 18/014,340

(22) PCT Filed: Aug. 4, 2020

(86) PCT No.: PCT/JP2020/029776
§ 371 (c)(1),
(2) Date: Jan. 4, 2023

(87) PCT Pub. No.: WO2022/029873
PCT Pub. Date: Feb. 10, 2022

(65) Prior Publication Data
US 2023/0258538 A1    Aug. 17, 2023

(51) Int. Cl.
*G06F 11/30*      (2006.01)
*G01M 99/00*     (2011.01)

(52) U.S. Cl.
CPC ................... *G01M 99/005* (2013.01)

(58) Field of Classification Search
CPC .................................................. G01M 99/005
See application file for complete search history.

(56) References Cited

U.S. PATENT DOCUMENTS 9,321,178 B2      4/2016  Cho et al.
2019/0383701 A1  12/2019  Tezuka

FOREIGN PATENT DOCUMENTS

JP      10-281925        * 10/1998
JP      10-281925 A     10/1998
(Continued)

OTHER PUBLICATIONS

International Search Report and Written Opinion mailed on Oct. 20, 2020, received for PCT Application PCT/JP2020/029776, filed on Aug. 4, 2020, 9 pages including English Translation.
(Continued)

*Primary Examiner* — Phuong Huynh
(74) *Attorney, Agent, or Firm* — XSENSUS LLP

(57) ABSTRACT

A synchronization device includes: a machine data acquisition unit acquiring, as machine data, time-series information regarding driving of a machine; a measurement data acquisition unit acquiring, as measurement data, time-series information regarding a state of the machine; a correlation calculation unit calculating a correlation time difference which is a time difference when the strength of correlation between the machine data and the measurement data is maximum on the basis of the machine data, the measurement data, and a time difference when any one of the machine data and the measurement data is staggered in a positive or negative direction of a time axis; a synchronized data output unit outputting the machine data synchronized with the measurement data and the measurement data synchronized with the machine data on the basis of the correlation time difference.

14 Claims, 17 Drawing Sheets

(56) References Cited

FOREIGN PATENT DOCUMENTS

| JP | 2007-323504 | * | 12/2007 |
|----|-------------|---|---------|
| JP | 2007-323504 A | | 12/2007 |
| JP | 2010-266327 A | | 11/2010 |
| JP | 2012-68065 | * | 4/2012 |
| JP | 2012-68065 A | | 4/2012 |
| JP | 2015-163416 A | | 9/2015 |
| JP | 2019-23771 A | | 2/2019 |
| JP | 2019-219725 A | | 12/2019 |

OTHER PUBLICATIONS

Notice of Reasons for Refusal mailed on May 11, 2021, received for JP Application 2021-504545, 8 pages including English Translation.

* cited by examiner

SYNCHRONIZATION DEVICE AND STORAGE MEDIUM

CROSS-REFERENCE TO RELATED APPLICATION

The present application is based on PCT filing PCT/JP2020/029776, filed Aug. 4, 2020, the entire contents of which are incorporated herein by reference.

FIELD

The present disclosure relates to a synchronization device that synchronously outputs a plurality of pieces of time-series data and to a storage medium.

BACKGROUND

It is known that in general, in a device including a power source such as a motor, a driving sound of the motor or a machine as an object to be driven by the motor includes a lot of information regarding states of the power source and the object to be driven. Accordingly, there has been a demand for a technique in which in order to determine a state of a device, measurement data which is data about a driving sound or vibration of a motor or a machine measured by a sensor or the like is acquired while machine data such as a position, a speed, or a torque of the motor or the machine is acquired, and these pieces of data are synchronously analyzed. However, since a system for acquiring machine data and a system for acquiring measurement data are basically different systems, some sort of ingenuity is required. Under such a technical background, Patent Literature 1 below discloses a technique in which a time point when a preset feature appears is extracted from each of machine data and measurement data measured by different systems, thereby synchronizing these two pieces of data with each other.

CITATION LIST

Patent Literature

Patent Literature 1: Japanese Patent Application Laid-open No. 2019-219725

SUMMARY

Technical Problem

In the technique of Patent Literature 1, a time point when the loudness of a processing sound exceeds a threshold or a time point when the acceleration of the vibration of a tool exceeds a threshold is exemplified as the time point when a preset feature appears. However, the time points when these features appear vary depending on drive conditions such as a configuration of a machine, the type of tool used for machining, a material for a workpiece to be machined, and an operation pattern. Therefore, the technique of Patent Literature 1 has a problem that it is necessary to reset, depending on such drive conditions, a time point when a feature appears. That is, the technique of Patent Literature 1 has a problem that setting work for preparation of a measurement is required prior to the measurement, and thus a synchronization process cannot be efficiently performed.

The present disclosure has been made in view of the above, and an object thereof is to obtain a synchronization device capable of efficiently performing a synchronization process.

Solution to Problem

In order to solve the above-described problem and achieve the object, a synchronization device according to the present disclosure includes a machine data acquisition unit, a measurement data acquisition unit, a correlation calculation unit, and a synchronized data output unit. The machine data acquisition unit acquires, as machine data, time series information regarding driving of a machine. The measurement data acquisition unit acquires, as measurement data, time-series information regarding a state of the machine as measurement data. The correlation calculation unit calculates a correlation time difference which is a time difference when the strength of correlation between the machine data and the measurement data is maximum on the basis of the machine data, the measurement data, and a time difference when any one of the machine data and the measurement data is staggered in a positive or negative direction of a time axis. The synchronized data output unit outputs, as synchronized machine data, the machine data synchronized with the measurement data on the basis of the correlation time difference. In addition, the synchronized data output unit outputs, as synchronized measurement data, the measurement data synchronized with the machine data on the basis of the correlation time difference.

Advantageous Effects of Invention

The synchronization device according to the present disclosure achieves an effect that it is possible to efficiently perform a synchronization process.

DESCRIPTION OF EMBODIMENTS

Hereinafter, a synchronization device and a storage medium according to each embodiment of the present disclosure will be described in detail with reference to the accompanying drawings.

First Embodiment

Figure 1:
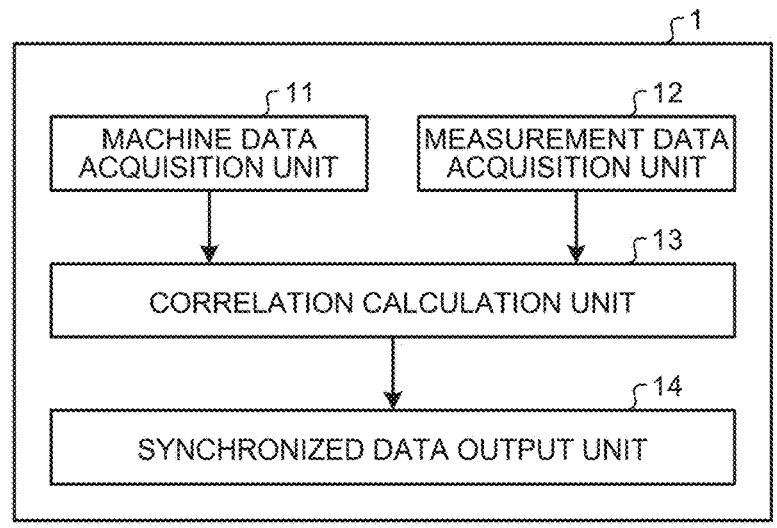
FIG. 1 is a block diagram illustrating an example of a functional configuration of a synchronization device according to a first embodiment.

FIG. 1 is a block diagram illustrating an example of a functional configuration of a synchronization device 1 according to a first embodiment. The synchronization device 1 according to the first embodiment includes a machine data acquisition unit 11, a measurement data acquisition unit 12, a correlation calculation unit 13, and a synchronized data output unit 14.

The machine data acquisition unit 11 acquires, as machine data, time-series information regarding an operation of a machine (not illustrated) connected to the synchronization device 1. The machine data is managed on the basis of first time information. The first time information is information indicating the acquisition time of the machine data. The machine data is information regarding driving of a machine driven by a power source such as a motor. Examples of the machine data include a command value related to the angle of rotation, a position, a rotational speed, a current, and a thrust of a motor connected to the machine, or measurement values thereof. The machine data acquisition unit 11 acquires at least one type of machine data. For example, the machine data about the angle of rotation and the machine data about the position are different types of machine data, and pieces of machine data about the angle of rotation in different time periods are the same type of machine data. In a case of acquiring a plurality of types of machine data, each of the plurality of types of machine data is associated with each other by the first time information, and each of the plurality of types of machine data is acquired with a predetermined sampling period.

The measurement data acquisition unit 12 acquires, as measurement data, time-series information regarding a state of the machine connected to the synchronization device 1. The measurement data is managed on the basis of second time information. The second time information is information indicating the acquisition time of the measurement data, and is acquired together with the measurement data. The measurement data is information obtained by measuring a state of a machine driven by a power source such as a motor by the machine or a sensor attached to the machine. Examples of the measurement data include a driving sound of the machine, a position of a movable portion of the machine, acceleration of vibration in the movable portion of the machine, a force and pressure received from the movable portion of the machine, and a captured moving image of a drive state of the machine. As the measurement data, a calculated value calculated using one or more measurement values may be used instead of directly using a measurement value measured by the sensor. The measurement data acquisition unit 12 acquires at least one type of measurement data. For example, the measurement data about the driving sound of the machine and the measurement data about the position of the movable portion of the machine are different types of measurement data, and pieces of the measurement data about the driving sound of the machine in different time periods are the same type of measurement data. The measurement data is acquired with a predetermined sampling period. The sampling period of the measurement data may be a period different from the sampling period of the machine data.

The correlation calculation unit 13 calculates a correlation evaluation value on the basis of the machine data acquired by the machine data acquisition unit 11 and the measurement data acquired by the measurement data acquisition unit 12. The correlation evaluation value is a value indicating the degree of strength of correlation between the machine data and the measurement data. The correlation evaluation value is calculated on the basis of one type of time-series data of the machine data and one type of time-series data of the measurement data. Regarding two pieces of data on the basis of which a correlation evaluation value is calculated, any combination may be employed as long as correlation occurs between the two pieces of data. Any of the examples of the machine data and the measurement data described above may be combined in any manner.

In addition, the correlation calculation unit 13 changes a time difference when any one of the machine data and the measurement data is staggered in a positive or negative direction of a time axis, and calculates, the correlation evaluation value on the basis of the changed time difference. That is, a plurality of correlation evaluation values can be obtained by changing the time difference. Furthermore, the correlation calculation unit 13 calculates a correlation value having the maximum correlation strength between the machine data and the measurement data, and calculates a correlation time difference which is a time difference when the correlation value is obtained.

The synchronized data output unit 14 synchronizes the machine data with the measurement data on the basis of the correlation time difference calculated by the correlation calculation unit 13. The synchronized data output unit 14 determines, as synchronized machine data, the machine data synchronized with the measurement data on the basis of the correlation time difference, and outputs the synchronized machine data to the outside of the synchronization device 1. In addition, the synchronized data output unit 14 determines, as synchronized measurement data, the measurement data synchronized with the machine data on the basis of the correlation time difference, and outputs the synchronized measurement data to the outside of the synchronization device 1. Pieces of the machine data and pieces of the measurement data can be associated with each other by the first time information and second time information, and information on the correlation time difference. Therefore, a synchronization process between different types of data can also be performed on the basis of the information on the correlation time difference calculated by the correlation calculation unit 13.

Figure 2:
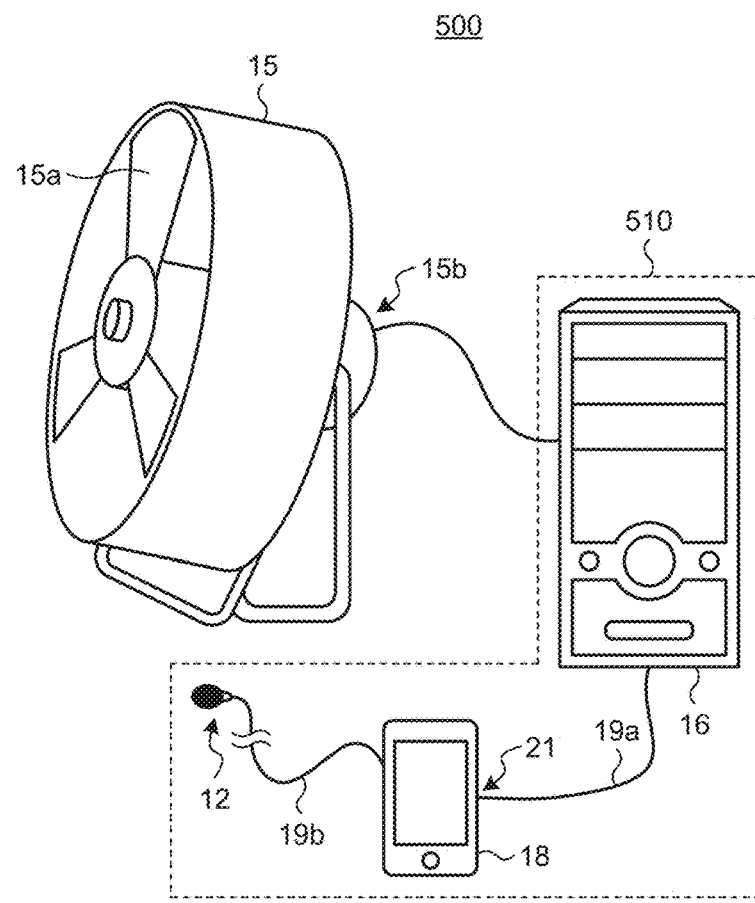
FIG. 2 is a view illustrating an example configuration of a drive system including a drive device having a function of the synchronization device according to the first embodiment.

FIG. 2 is a view illustrating an example configuration of a drive system 500 including a drive device 510 having a function of the synchronization device 1 according to the first embodiment. In FIG. 2, the drive system 500 includes a blower 15 and the drive device 510 that drives the blower 15. The drive device 510 includes a control device 16, the measurement data acquisition unit 12, and an inspection terminal 18. The blower 15 includes an impeller 15a and a motor 15b attached to the impeller 15a. The blower 15 and the inspection terminal 18 are electrically connected to the control device 16.

The control device 16 includes an inverter (not illustrated). The control device 16 drives the motor 15b by supplying an electric signal to the motor 15b. The the impeller 15a is rotationally driven by the motor 15b, and rotates at a predetermined speed. The rotational speed of the impeller 15a varies response to the electric signal output from the control device 16, and a sound caused by air blowing also varies simultaneously.

The measurement data acquisition unit 12 measures the sound pressure of a sound emitted by at least one of the blower 15 and the control device 16. An example of the measurement data acquisition unit 12 is a microphone. The measurement data acquisition unit 12 may be installed at a preset fixed position in the configuration of the drive system 500, or may be installed at any position in accordance with the configuration of the drive system 500. The measurement data acquisition unit 12 is desirably installed near the blower 15 or the control device 16 each of which is a source of a sound to be measured. In a case of using a microphone as the measurement data acquisition unit 12, the microphone desirably has directivity. In a case where the microphone has directivity, it is possible to reduce mixing of ambient noise into the measurement data to be acquired.

The inspection terminal 18 is a terminal device that provides an inspector of the blower 15 with information necessary for inspection. The inspection terminal 18 includes a cable connector 21, and is connected to the control device 16 via a cable 19a which is detachable. The inspection terminal 18 acquires control data of the control device 16 via the cable 19a. Examples of the inspection terminal 18 include a smartphone, a tablet terminal, and a laptop computer.

The inspection terminal 18 is connected to the measurement data acquisition unit 12 via a cable 19b. The inspection terminal 18 acquires sound pressure data measured by the measurement data acquisition unit 12.

As the cables 19a and 19b, cables used for data exchange between information terminals such as a universal serial bus (USE) cable, a local area network (LAN) cable, and a serial peripheral interface (SPI) communication cable can be used. The inspection terminal 18 includes a connector of a required standard depending on a cable used for connection.

The connection between the inspection terminal 18 and the measurement data acquisition unit 12 and the connection between the inspection terminal 18 and the control device 16 may be made by wireless communication without using a cable.

In addition, a microphone built in the inspection terminal 18 may be used as the measurement data acquisition unit 12. In that case, only the inspection terminal 18 and the cable 19a connecting the control device 16 and the inspection terminal 18 are the devices that need to be carried at the time of inspection, and thus the number of accessories can be reduced. As a result, the inspection can be performed more easily.

Figure 3:
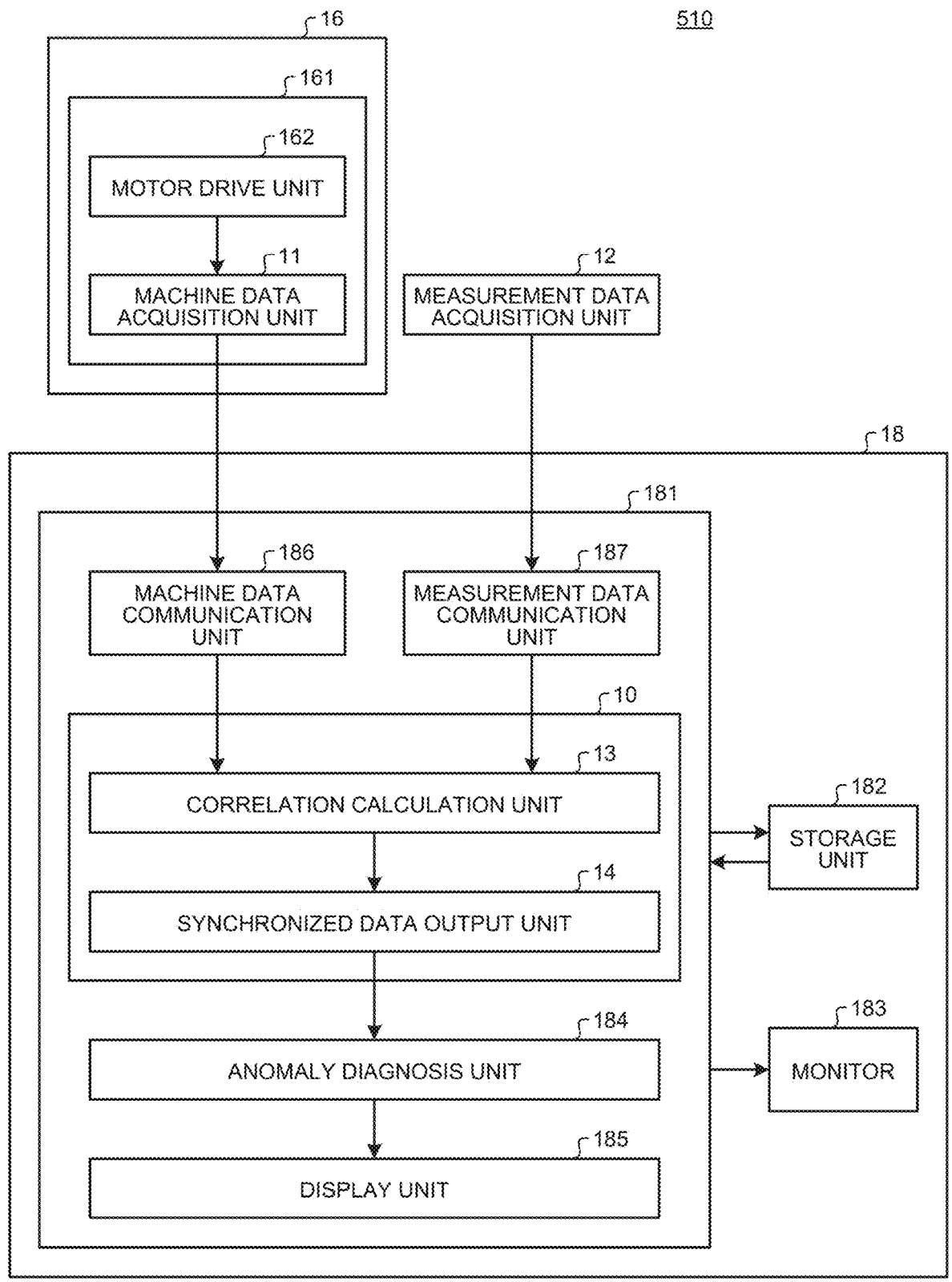
FIG. 3 is a block diagram illustrating an example of a functional configuration of the drive device according to the first embodiment illustrated in FIG. 2.

FIG. 3 is a block diagram illustrating an example of a functional configuration of the drive device 510 according to the first embodiment illustrated in FIG. 2. As illustrated in FIG. 3, the drive device 510 includes the measurement data acquisition unit 12, the control device 16, and the inspection terminal 18. The control device 16 includes a control unit 161, and the inspection terminal 18 includes a control unit 181, a storage unit 182, and a monitor 183.

The control unit 161 is a component that integrally controls the entirety of the control device 16. The control unit 161 includes a motor drive unit 162 and the machine data acquisition unit 11. The motor drive unit 162 is a component that generates an electric signal for controlling a drive state of a motor connected to the control device 16 on the basis of a command from a user of the drive device 510 or a higher-level controller.

The machine data acquisition unit 11 is connected to the motor drive unit 162, and acquires data about driving of the control device 16 in time series. The machine data acquisition unit 11 stores machine data collected in time series together with the first time information managed by the control device 16. The measurement data acquisition unit 12 stores measurement data collected time series together with the second time information.

In the inspection terminal 18, the control unit 181 is a component that integrally controls the entirety of the inspection terminal 18. The control unit 181 includes a synchronization unit 10, an anomaly diagnosis unit 184, a display unit 185, a machine data communication unit 186, and a measurement data communication unit 187. The synchronization unit 10 includes the correlation calculation unit 13 and the synchronized data output unit 14. In the configuration of FIG. 3, the functions of the machine data acquisition unit 11 and the measurement data acquisition unit 12 are provided outside the inspection terminal 18. As a result, the machine data acquisition unit 11 and the measurement data acquisition unit 12 are deleted from the synchronization unit 10. On the other hand, the synchronization unit 10 includes the correlation calculation unit 13 and the synchronized data output unit 14, and therefore has a function of outputting synchronized machine data and synchronized measurement data. Therefore, the synchronization unit 10 may be regarded as a component equivalent to the synchronization device 1.

The synchronization unit 10 is connected to the machine data acquisition unit 11 via the machine data communication unit 186. The machine data communication unit 186 acquires machine data from the machine data acquisition unit 11 by communication. The synchronization unit 10 acquires the machine data from the machine data communication unit 186 at a required timing, and stores the machine data in the storage unit 182. In addition, the synchronization unit 10 is connected to the measurement data acquisition unit 12 via the measurement data communication unit 187. The measurement data communication unit 187 acquires measurement data from the measurement data acquisition unit 12 by communication. The synchronization unit 10 acquires the measurement data from the measurement data communication unit 187 at a required timing, and stores the measurement data in the storage unit 182.

The first time information managed by the control device 16 and the second time information managed by the measurement data acquisition unit 12 are managed by different systems, and therefore are pieces of time information different from each other. Regarding the machine data and the measurement data based on different pieces of time information, the synchronization unit 10 performs a synchronization process in a procedure to be described later on the basis of the information on the time difference calculated by the correlation calculation unit 13. The machine data and the measurement data subjected to the synchronization process are output from the synchronized data output unit 14 as synchronized machine data and synchronized measurement data, respectively.

The anomaly diagnosis unit 164 diagnoses a state of the blower 15 or the control device 16 using the synchronized machine data and the synchronized measurement data. For example, in a case where although the rotational speed of the motor 15b, which is the machine data, has changed from stop to a speed commanded by the user, the sound pressure of the driving sound of the blower 15, which is the measurement data, does not change, it can be diagnosed that an anomaly has occurred in the blower 15. Although a command to start blowing has been issued to the blower 15, there is no blowing sound and no blowing is performed, so that such a diagnosis can be made. The diagnosis by the anomaly diagnosis unit 184 is only required to be an anomaly diagnosis using the synchronized machine data and the synchronized measurement data, and it is sufficient to perform a necessary diagnosis depending on a device configuration or a drive pattern.

The display unit 185 visualizes and displays a diagnosis result of the anomaly diagnosis performed by the anomaly diagnosis unit 184. At that time, as a basis of the diagnosis result, the synchronized machine data and the synchronized measurement data synchronized by the synchronization unit 10 may be displayed by the display unit 185 using a means such as a graph. The display of the synchronized machine data and the synchronized measurement data enables the inspector to further understand the cause of the diagnosis result. At that time, it is desirable that the synchronized machine data and the synchronized measurement data at the same time be arranged in a vertical direction or a horizontal direction, and be displayable as graphs arranged in parallel or superimposed. If such display is possible, the inspector can check the state of the machine in a more easily understandable manner.

The storage unit 182 is connected to the control unit 181, stores machine data or measurement data 117 response to a request from the control unit 181, and stores an anomaly diagnosis result or the like as necessary. The storage unit 182 includes a read only memory (ROM) or a random access memory (RAM), and can be constituted by further using a flash memory, a hard disk drive (HDD), or a solid state drive (SSD).

The monitor 183 is controlled by the display unit 185. The monitor 183 displays, for the inspector, the anomaly diagnosis result obtained by the anomaly diagnosis unit 184. An example of the monitor 183 is a liquid crystal display device. The monitor 183 only needs to be able to notify the inspector of the diagnosis result, and may be constituted by using a light emitting diode (LED), a sound reproduction means, or the like.

Respective functions of the control units 161 and 181 can be realized by software. In a case where the functions are realized by software, a program constituting the software is installed in a computer that executes the functions of the control units 161 and 181. Regarding the respective functions of the control units 161 and 181, there is no limitation to realization by software. The respective functions of the control units 161 and 181 may be realized by using an electronic circuit such as an application specific integrated circuit (ASIC), a field programmable gate array (FPGA), or a complex programmable logic device (CPLD).

Figure 4:
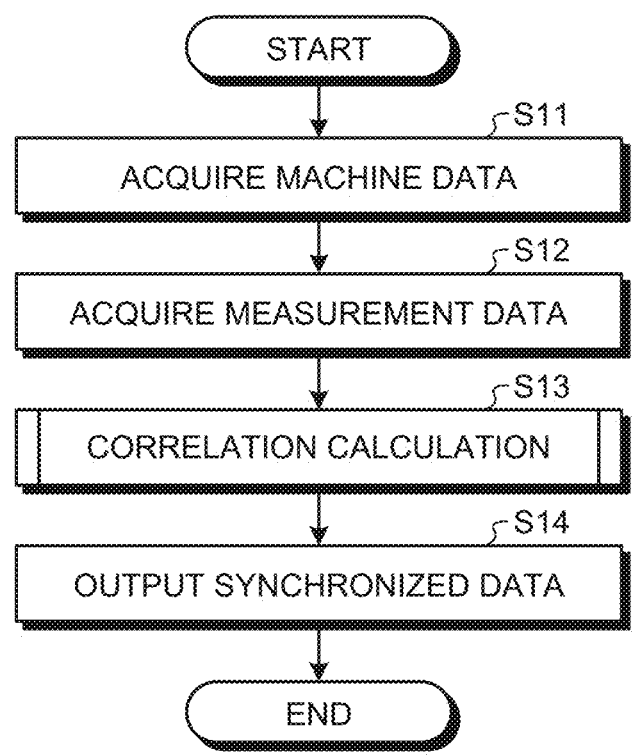
FIG. 4 is a flowchart illustrating an example of a processing procedure of a synchronization process in the first embodiment.
Figure 5:
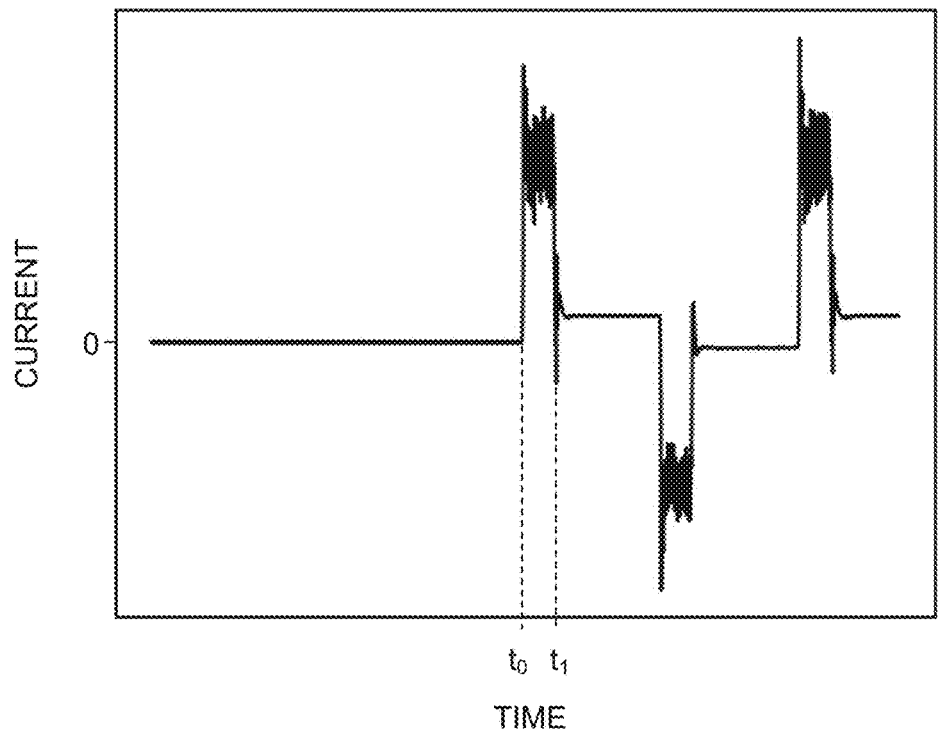
FIG. 5 is a waveform diagram illustrating an example of machine data used to describe FIG. 4.
Figure 6:
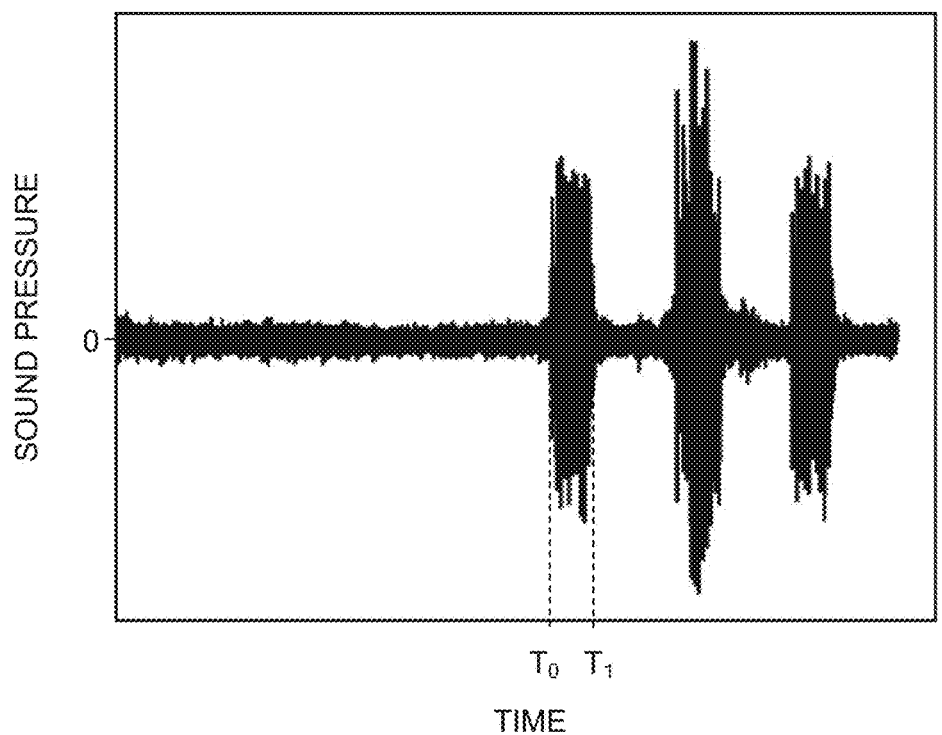
FIG. 6 is a waveform diagram illustrating an example of measurement data used to describe FIG. 4.
Figure 7:
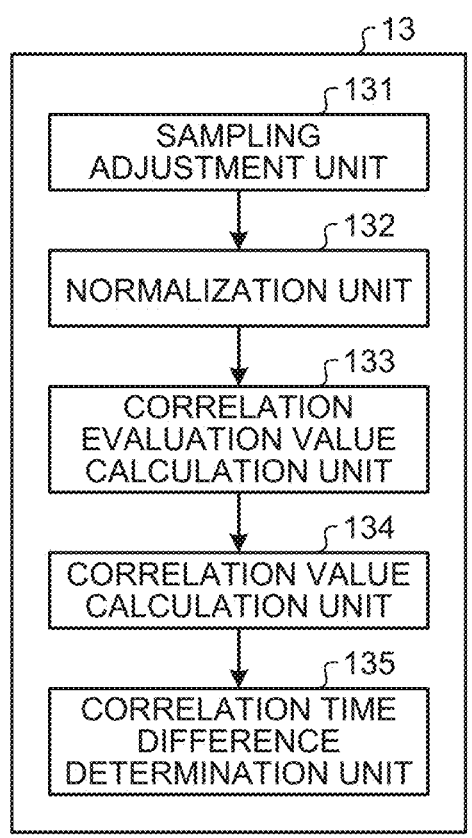
FIG. 7 is a block diagram illustrating an example of a functional configuration of a correlation calculation unit in the first embodiment.
Figure 8:
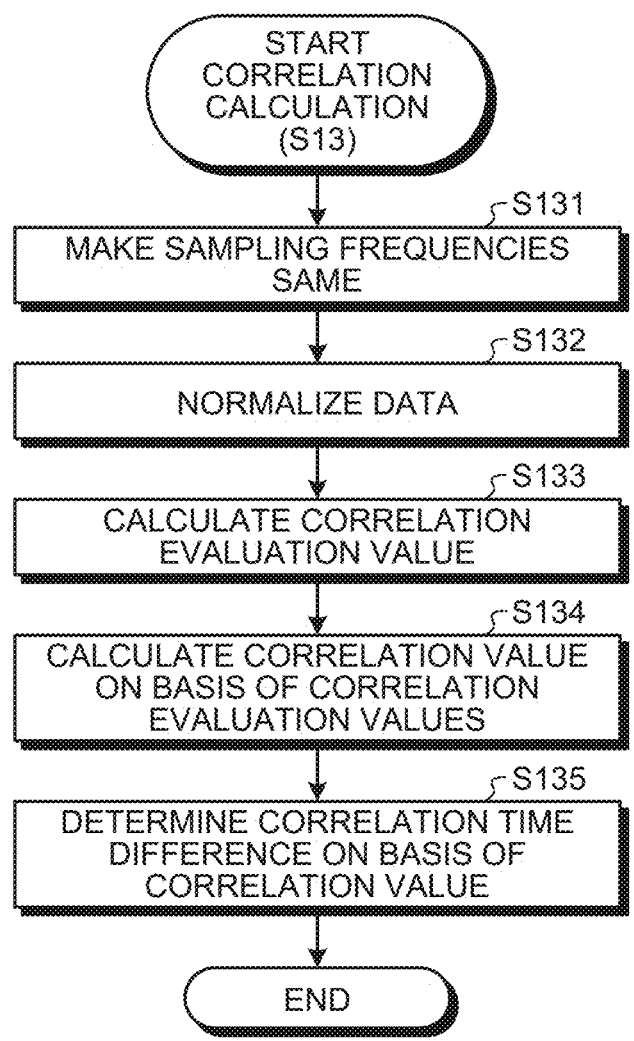
FIG. 8 is a flowchart illustrating an example of a processing procedure of a correlation calculation illustrated in FIG. 4.
Figure 9:
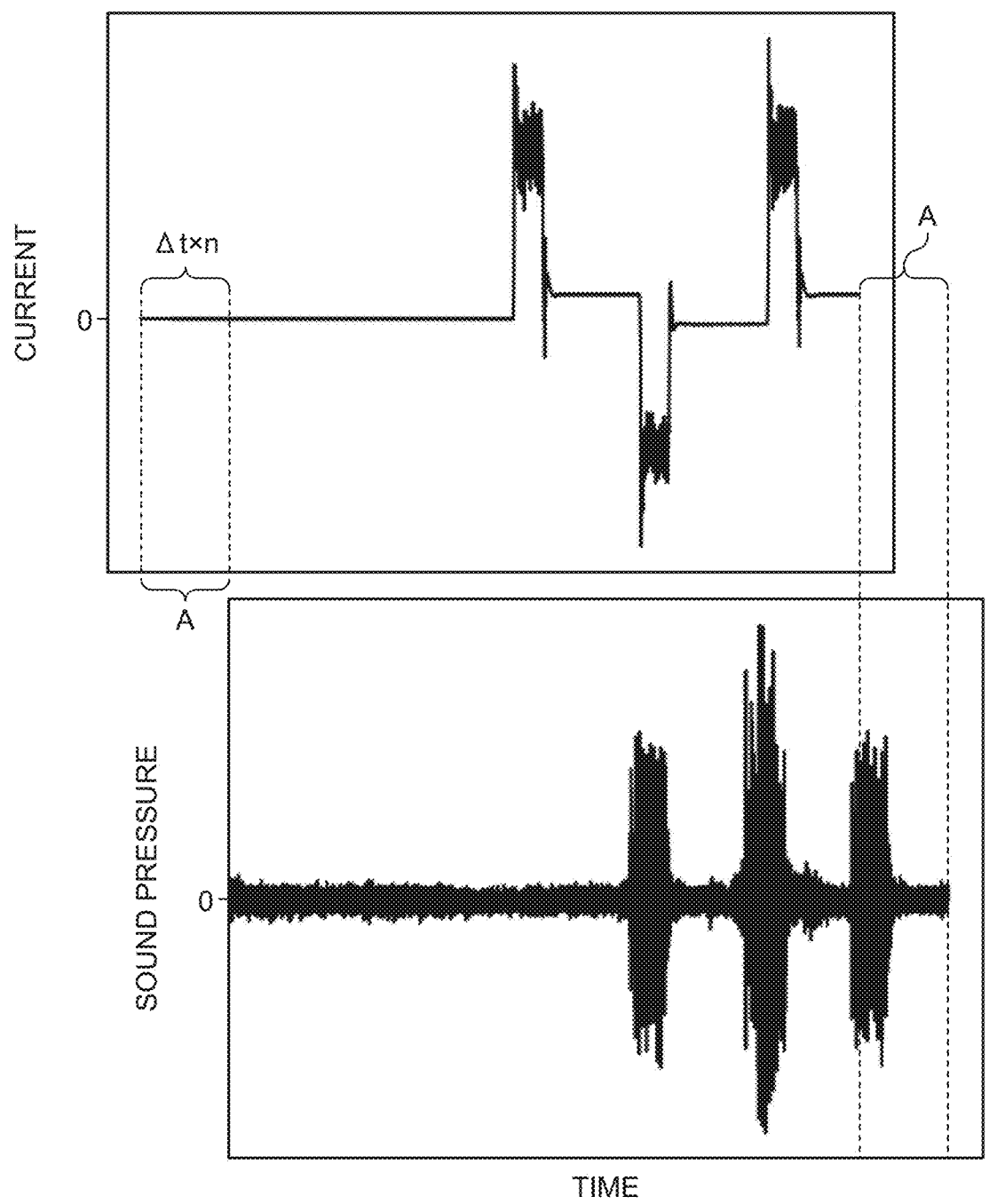
FIG. 9 is a waveform diagram used to describe a process of outputting synchronized data in the first embodiment.

Next, the synchronization process in the first embodiment will be described with reference further to FIGS. 4 to 9 in addition to FIGS. 2 and 3. FIG. 4 is a flowchart illustrating an example of a processing procedure of the synchronization process in the first embodiment. FIG. 5 is a waveform diagram illustrating an example of machine data used to describe FIG. 4. FIG. 6 is a waveform diagram illustrating an example of measurement data used to describe FIG. 4. FIG. 7 is a block diagram illustrating an example of a functional configuration of the correlation calculation unit 13 in the first embodiment. FIG. 8 is a flowchart illustrating an example of a processing procedure of a correlation calculation illustrated in FIG. 4. FIG. 9 is a waveform diagram used to describe a process of outputting synchronized data in the first embodiment.

First, in step S11, the machine data acquisition unit 11 acquires machine data. FIG. 5 illustrates, as an example of the machine data, current data indicating the magnitude of a current supplied from the motor drive unit 162 to the motor 15b. The horizontal axis in FIG. 5 represents time. FIG. 5 illustrates a waveform in a case where the blower 15 is started operating at a time $t_0$, is driven at a constant current for a while, and then is stopped operating at a time $t_1$. At and after the time $t_1$, illustrated is a waveform in a case where the blower 15 is driven at a constant current while alternately reversing the polarity of the current. The times $t_0$ and $t_1$ are the first time information described above.

The current data is sampled by the machine data acquisition unit 11. In the first embodiment, a sampling frequency of the current data is assumed to be 100 Hz. The sampling frequency is not necessarily 100 Hz, and any sampling frequency can be set depending on data accuracy, hardware performance, and the like. The machine data acquired in step S11 is input to the synchronization unit via the machine data communication unit 186.

In step S12, the measurement data acquisition unit 12 acquires measurement data. FIG. 6 illustrates, as an example of the measurement data measured by the measurement data acquisition unit 12, sound pressure data representing a driving sound of the blower 15 when the blower 15 is driven by the current waveform in FIG. 5. The horizontal axis in FIG. 6 represents time. The sound pressure data in FIG. 6 is acquired at the same timing as that in FIG. 5, but acquisition times $T_0$ and $T_1$ are based on the second time information managed by the measurement data acquisition unit 12, and thus times different from those in FIG. 5 are given.

In the first embodiment, a sampling frequency of the measurement data is assumed to be 48 kHz. The sampling frequency is not necessarily 48 kHz, and any sampling frequency can be set depending on data accuracy, hardware performance, and the like. The measurement data acquired in step S12 is input to the synchronization unit 10 via the measurement data communication unit 187.

The process of step S11 and the process of step S12 may be performed in reverse order or may be performed simultaneously. In addition, in the processes of steps S11 and S12, data to be acquired is not necessarily all pieces of data to be synchronized, and some pieces of data may be acquired. The data to be acquired at that time is only required to be data on a section including data acquired at the same time. By limiting the data to be acquired to some pieces of data, it is possible to reduce the amount of calculation of a process performed by the correlation calculation unit 13 to be described later.

In step S13, the correlation calculation unit 13 performs a correlation calculation using the machine data acquired in the process of step S11 and the measurement data acquired in the process of step S12. The correlation calculation unit 13 calculates a correlation evaluation value indicating the degree of strength of correlation between the machine data and the measurement data, and calculates a correlation value at which the degree of strength of correlation is maximum and a correlation time difference on the basis of a plurality of calculated correlation evaluation values. More details of the correlation calculation will be described later.

In step S14, the synchronized data output unit 14 outputs synchronized data on the basis of a result of the correlation calculation performed in step S13. The synchronized data described here is the above-described synchronized machine data and synchronized measurement data.

Next, the process in step S13 in the flowchart of FIG. 4 will be described. The process of step S13 is performed by the correlation calculation unit 13 in accordance with the flowchart of FIG. 8. As illustrated in FIG. 7, the correlation calculation unit 13 includes a sampling adjustment unit 131, a normalization unit 132, a correlation evaluation value calculation unit 133, a correlation value calculation unit 134, and a correlation time difference determination unit 135.

In step S131 of FIG. 8, the correlation calculation unit 13 performs a process of making the sampling frequency of the machine data and the sampling frequency of the measurement data the same. This process is performed by the sampling adjustment unit 131 of FIG. 7.

As described above, in the present example, the sampling frequency of the current data as the machine data is 100 Hz, and the sang frequency of the sound pressure data as the measurement data is 48 kHz. Therefore, as for the sound pressure data, a period in which sampling is performed 480 times is set as a decimation period, and one piece of data is extracted for each decimation period from the sound pressure data. As a result of this process, the measurement data is decimated into 100 Hz.

In the above process, a decimation frequency, which is a reciprocal of the decimation period, is set to 100 Hz. The 100 Hz is the greatest common divisor of the sampling frequency of the machine data and the sampling frequency of the measurement data, but the decimation frequency may be a value smaller than the greatest common divisor. By setting the decimation frequency to a value smaller than the greatest common divisor, the amount of calculation performed after a decimation process by the correlation calculation unit 13 can be reduced.

As described above, the sampling adjustment unit 131 performs the decimation process depending on the sampling frequency of the machine data and the sampling frequency of the measurement data, and generates the machine data and the measurement data adjusted to have the same sampling period. The sampling period described here is a decimation period. The sampling adjustment unit 131 may perform an interpolation process instead of the decimation process or together with the decimation process to generate the machine data and the measurement data adjusted to have the same sampling frequency.

In addition, the sampling adjustment unit 131 may perform a filter process using a digital filter on any one or both of the machine data and the measurement data before the decimation process. Examples of the digital filter include a low-pass filter, a high-pass filter, and a band-pass filter. By performing the filter process, it is possible to reduce the influence of aliasing noise generated when the decimation process or the interpolation process is performed. In addition, by performing the filter process, it is possible to reduce the influence of noise generated when the machine data acquisition unit 11 and the measurement data acquisition unit 12 acquire respective pieces or data.

In step S132 of FIG. 8, the normalization unit 132 normalizes the machine data and the measurement data adjusted to have the same sampling period. The normalization unit 132 subtracts, from each of the machine data and the measurement data, an offset component thereof to make an average value of each of the machine data and the measurement data zero. In addition, the normalization unit 132 performs scaling between the machine data and the measurement data by multiplying any one or both of the machine data and the measurement data by a certain numerical value.

The normalization performed by the normalization unit 132 makes it possible to reduce the influence of an error caused by the machine data and the measurement data being different types of data when calculating a correlation evaluation value. In particular, the machine data and the measurement data may be data of different dimensions. The process of step S131 and the process of step S132 may be performed in reverse order. That is, the process by the normalization unit 132 may precede the process by the sampling adjustment unit 131. However, when the process by the sampling adjustment unit 131 is performed first, the amount of calculation can be reduced. Therefore, in a case where it is desired to reduce a calculation load, the process by the sampling adjustment unit 131 is desirably performed first.

Next, in step S133 of FIG. 8, the correlation evaluation value calculation unit 133 calculates a correlation evaluation value indicating the degree of strength of correlation between the machine data and the measurement data. In next step S134, the correlation value calculation unit 134 calculates a plurality of correlation evaluation values between the machine data and the measurement data, and calculates a correlation value on the basis of the plurality of correlation evaluation values. That is, the correlation value calculation unit 134 calculates, as a correlation value, a correlation evaluation value having the maximum correlation strength among the plurality of correlation evaluation values. Furthermore, in step S135, the correlation time difference determination unit 135 determines a correlation time difference on the basis or the correlation value. The correlation time difference is information on a time difference when a correlation value having the maximum correlation strength is obtained.

Next, a determination procedure of the correlation time difference will be described more specifically. First, any one of the machine data and the measurement data is determined as reference data. It is desirable to use, as the reference data, data stored for a shorter time out of the machine data and the measurement data. Hereinafter, for convenience, the reference data is referred to as "first data", and data which is not the reference data is referred to as "second data".

Next, a correlation evaluation value between data obtained by staggering the second data by a sampling period Δt and the first data is calculated. By this calculation, a correlation evaluation value sequence including a plurality of correlation evaluation values is obtained. When the correlation evaluation value is denoted by V, the correlation evaluation value sequence can be expressed as follows using integers N and N and the sampling period Δt.

$$\{V(\Delta t \times (-M)), \ldots, V(\Delta t \times (-1)), V(\Delta t \times 0), V(\Delta t \times 1), \ldots, V(\Delta t \times N)\}$$

In the above correlation evaluation value sequence, the integers M and N are coefficients that determine the maximum time difference between a time staggered in the negative direction of the time axis and a time staggered in the positive direction of the time axis. The maximum time difference can be determined by using sample times of respective pieces of data. In a case where the maximum time difference is determined in advance from the configuration of the device, a value thereof may be used.

On a lower side of FIG. 9, the sound pressure data illustrated in FIG. 6 is illustrated as the first data. In addition, on an upper side of FIG. 9, the current data illustrated in FIG. 5 is illustrated as the second data, and a waveform obtained by staggering the entire waveform of the current data in the negative direction of the time axis by time Δt×n is illustrated. That is, in the waveform of FIG. 9, the start of the current data is advanced by the time Δt×n with respect to the sound pressure data as the reference data.

Regarding the correlation evaluation value calculated for the first data as the reference data and the second data that has been staggered in time, an evaluation index capable of calculating similarity between the two pieces of time-series data is used. Specific examples of the evaluation index include a correlation coefficient, a covariance, an absolute value error, a square error, and a Mahalanobis distance. At that time, for a section having only one piece of data out of the two pieces of time-series data as a result of staggering by the time Δt×n, for example, an A section in FIG. 9, a calculated value is set to be zero.

In addition, in a case where respective pieces of data used for the calculation of the correlation evaluation value have negative values, the calculation may be performed by obtaining absolute values of the respective pieces of data. In a case where the degree of influence of an absolute value is high and the degree of influence on a phase is low in a comparison of correlation evaluation values, an appropriate correlation evaluation can be performed by obtaining and comparing absolute values of the respective pieces of data. In particular, in a case where a frequency component of the sound pressure data is used as the measurement data, the frequency component of the sound pressure data does not include a phase, so that is desirable to use an absolute value of the machine data in the correlation calculation.

Next, a correlation evaluation value having the maximum correlation strength in the calculated correlation evaluation value sequence is set as a correlation value, and a value of a time difference when the correlation value is obtained is set as a correlation time difference. The correlation evaluation value having the maximum correlation strength is a value at which the correlation evaluation value is maximum or minimum. Whether the correlation evaluation value is maximum or minimum depends on what is used as the correlation evaluation value.

The correlation time difference is obtained by the above procedure. In the first embodiment, the correlation time difference is obtained by calculating the time difference at which the correlation evaluation value is maximum or minimum. However, the correlation calculation unit 13 is only required to obtain the correlation time difference which is a time difference at which the correlation is strongest, and may calculate the correlation time difference by a method that does not obtain the correlation evaluation value. For example, the correlation time difference may be obtained by calculating a phase difference using Fourier transform, or may be obtained using a convolutional neural network. The synchronized data output unit 14 can output the synchronized machine data and the synchronized measurement data on the basis of the correlation time difference. The synchronized machine data is machine data synchronized with the measurement data. The synchronized measurement data is measurement data synchronized with the machine data. In the above example, since the sound pressure data is used as the reference data, the sound pressure data and the current data can be synchronized by staggering the current data relative to the reference data by the correlation time difference.

The synchronization device according to the first embodiment can synchronize the machine data and the measurement data based on different pieces of time information acquired by different systems on the basis of the correlation calculation between both pieces of data. As a result, even if the two pieces of data to be subjected to the synchronization process are data based on different Pieces of time information acquired by different systems, the synchronization device can synchronously output these two pieces of data.

In addition, according to the synchronization device of the first embodiment, synchronization is performed by calculating correlation, so that it is not necessary to set a feature serving as reference for synchronization in the synchronization device. As a result, the synchronization process between the machine data and the measurement data can be more easily performed. In particular, since it is not necessary to store machine data at normal time or measurement data at normal time for synchronization, the synchronization process can be performed from a first time of operation.

The correlation between the machine data and the measurement data used in the synchronization device according to the first embodiment is generic one. Therefore, in a machine including the synchronization device according to the first embodiment incorporated therein, a plurality of pieces of time-series data can be synchronously output. For example, a relationship between a current value of a motor and the magnitude of a driving sound generated from the motor is a relationship in which when a current flows through the motor, the motor is driven and thus the driving sound increases, and when no current flows through the motor, the motor stops and thus the driving sound decreases. This relationship does not depend on a drive pattern of the motor. Therefore, in many machines including motors, even when the configuration or drive pattern of each of the machines is changed, a plurality of pieces of time-series data can be synchronously output.

The synchronization device according to the first embodiment performs a synchronization process by performing a correlation calculation between machine data and measurement data which are different from each other and acquired by different systems. As a result, the inspection terminal including the synchronization device according to the first embodiment incorporated therein can diagnose an anomaly of the blower on the basis of the synchronized machine data and the synchronized measurement data output by the synchronization device. As a result, the inspection terminal according to the first embodiment can diagnose an anomaly using machine data and measurement data acquired by different devices without installing a high-speed network for synchronization. The inspection terminal according to the first embodiment can diagnose an anomaly without performing resetting for synchronization even when a drive pattern of the blower or a mechanical configuration of the blower is changed.

In addition, it is possible for the inspection terminal according to the first embodiment to bring a microphone close to a position which is a possible factor of an anomalous sound of a device to record the anomalous sound, and to display sound pressure data of the anomalous sound in synchronization with machine data at the time of occurrence of the anomalous sound. As a result, when an anomalous sound occurs in the blower, the user can visualize the machine data and the anomalous sound. Then, the inspector can estimate the factor of the anomalous sound by clearly observing the relationship between the machine data and the anomalous sound. In particular, by the machine data and the measurement data at the same time being displayed in parallel so as to be aligned on a straight line in the same direction, i.e., vertical or horizontal direction, it is possible to present the state of the machine in a more easily understandable manner.

Furthermore, the inspection terminal according to the first embodiment can perform a synchronization process between input machine data and measurement data. As a result, even in a case where the inspection terminal is later attached to an existing device, it is possible to obtain an effect similar to that in a case where the inspection terminal is mounted at a time of shipment. In particular, by incorporating the measurement data acquisition unit in the inspection terminal, a mechanical state of the existing device can be visualized more easily.

Moreover, the inspection terminal according to the first embodiment can perform inspection of a plurality of devices with one terminal by sequentially connecting the inspection terminal to the devices with cables. As a result, the number of inspection terminals needed can be saved.

The synchronization device according to the first embodiment may include the sampling adjustment unit. Sampling adjustment performed by the sampling adjustment unit makes it possible to calculate a correlation evaluation value to perform a synchronization process even in a case where the machine data and the measurement data have different sampling periods.

In addition, the synchronization device according to the first embodiment may include the normalization unit. Normalization of data performed by the normalization unit before calculating the correlation evaluation value makes it possible to reduce the influence of an error caused in a case where the machine data and the measurement data are in different units.

Second Embodiment

Figure 10:
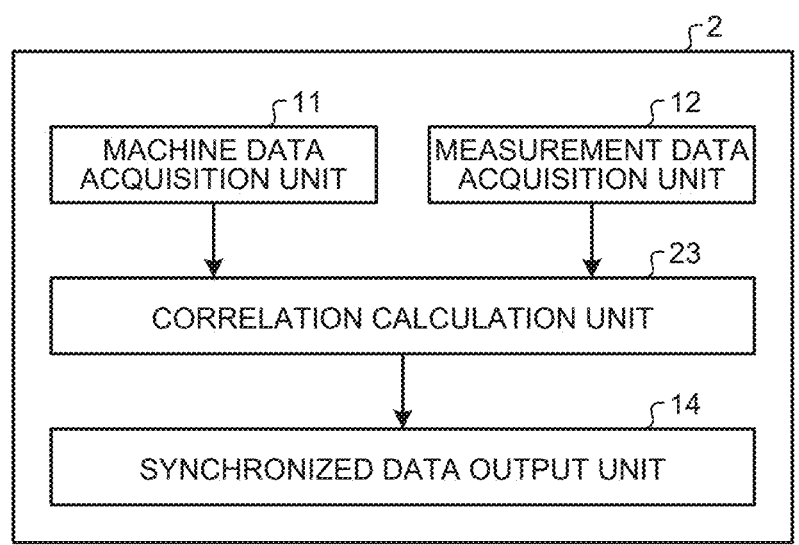
FIG. 10 is a block diagram illustrating an example of a functional configuration of a synchronization device according to a second embodiment.

FIG. 10 is a block diagram illustrating an example of a functional configuration of a synchronization device 2 according to a second embodiment. As compared with the configuration of the synchronization device 1 according to the first embodiment illustrated in FIG. 1, in the synchronization device 2 according to the second embodiment, the correlation calculation unit 13 is replaced with a correlation calculation unit 23. In the second embodiment, a temporal change in a frequency spectrum is used as data to be synchronized. Therefore, the correlation calculation unit 23 calculates a correlation after performing a frequency transform on the data. Other components are the same as or equivalent to those illustrated in FIG. 1. The same or equivalent components are denoted by the same reference numerals as those in FIG. 1, and redundant descriptions thereof will be omitted.

Figure 11:
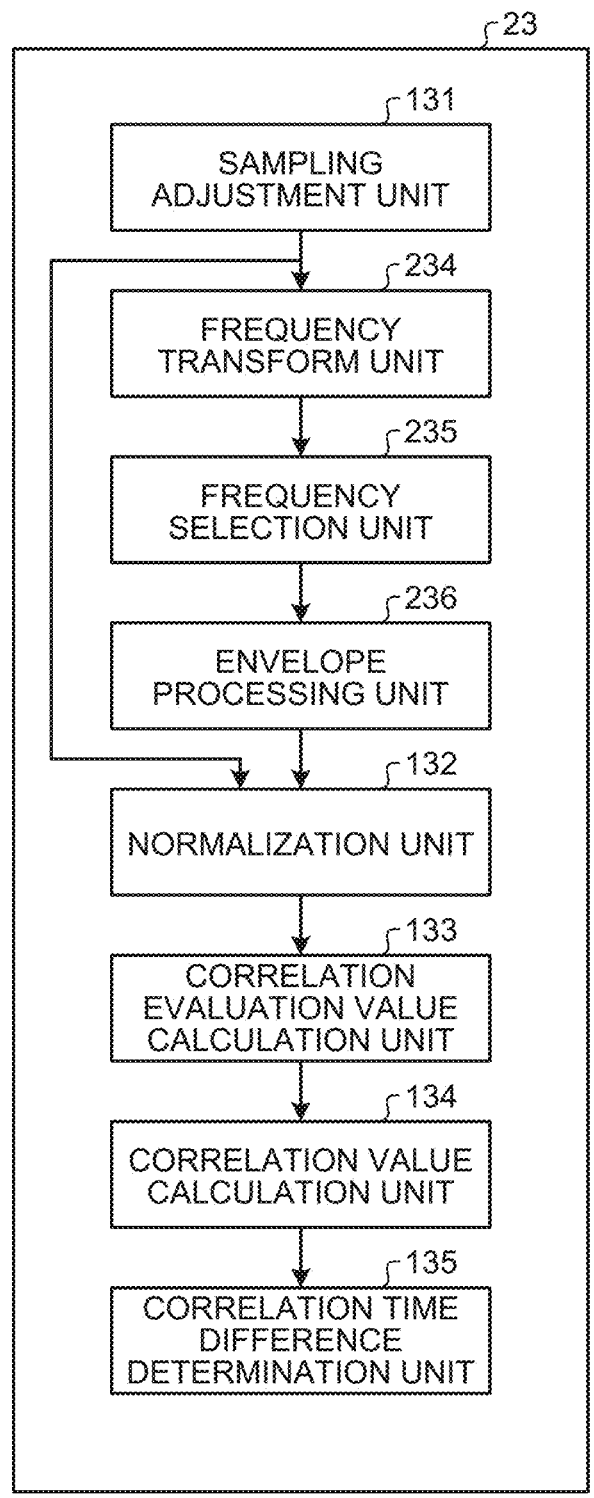
FIG. 11 is a block diagram illustrating an example of a functional configuration of a correlation calculation unit in the second embodiment.

FIG. 11 is a block diagram illustrating an example of a functional configuration of the correlation calculation unit 23 in the second embodiment. As compared with the configuration of the correlation calculation unit 13 in the first embodiment illustrated in FIG. 7, the correlation calculation unit 23 in the second embodiment includes a frequency transform unit 234, a frequency selection unit 235, and an envelope processing unit 236 between the sampling adjustment unit 131 and the normalization unit 132. Other components are the same as or equivalent to those illustrated in FIG. 7. The same or equivalent components are denoted 1 the same reference numerals as those in FIG. 7, and redundant descriptions thereof will be omitted.

In FIG. 11, the sampling adjustment unit 131 performs the decimation process depending on the sampling frequency of the machine data and the sampling frequency of the measurement data, and generates the machine data and the measurement data adjusted to have the same sampling period. Out of the machine data and the measurement data adjusted to have the same sampling period, data not to be subjected to a frequency transform process is input to the normalization unit 132. On the other hand, data to be subjected to the frequency transform process is input to the frequency transform unit 234.

The frequency transform unit 234 performs a process of transforming at least one piece of time-series data of the machine data or the measurement data into a frequency spectrum of time series. As a method of performing a transform into such a frequency spectrum of time series, a short time fast Fourier transform (STFFT), a wavelet transform, a discrete cosine transform, a cepstrum, or the like can be used. The frequency spectrum of time series transformed by the frequency transform unit 234 can be used for display on a display unit 287 described later.

The frequency selection unit 235 selects a frequency spectrum in a predetermined frequency range from the frequency spectrum of time series calculated by the frequency transform unit 234, and employs the frequency spectrum as machine data or measurement data used for a correlation calculation. Here, the frequency range for the selection desirably includes a frequency related to an operation of a mechanical device. Examples thereof include a resonance frequency of the mechanical device, a rotation frequency of the device, and a frequency which is an integral multiple of these frequencies. The frequency range for the selection may be set in advance, or may be determined from the obtained machine data or measurement data.

In a case where the wavelet transform or the discrete cosine transform used in the frequency transform unit 234, the process by the frequency transform unit 234 and the process by the frequency selection unit 235 may be performed in reverse order. In a case where the process by the frequency selection unit 235 is performed first, the calculated frequency spectrum of time series cannot be used for display, but the calculation of the frequency transform can be limited to the frequency range for the selection, so that an effect of reducing the amount of calculation can be obtained.

The envelope processing unit 236 detects an envelope for time-series data of a frequency spectrum in the frequency range for the selection. Examples of an envelope process include a low-pass filter process and a Hilbert transform. The envelope processing unit 236 may be omitted.

Figure 12:
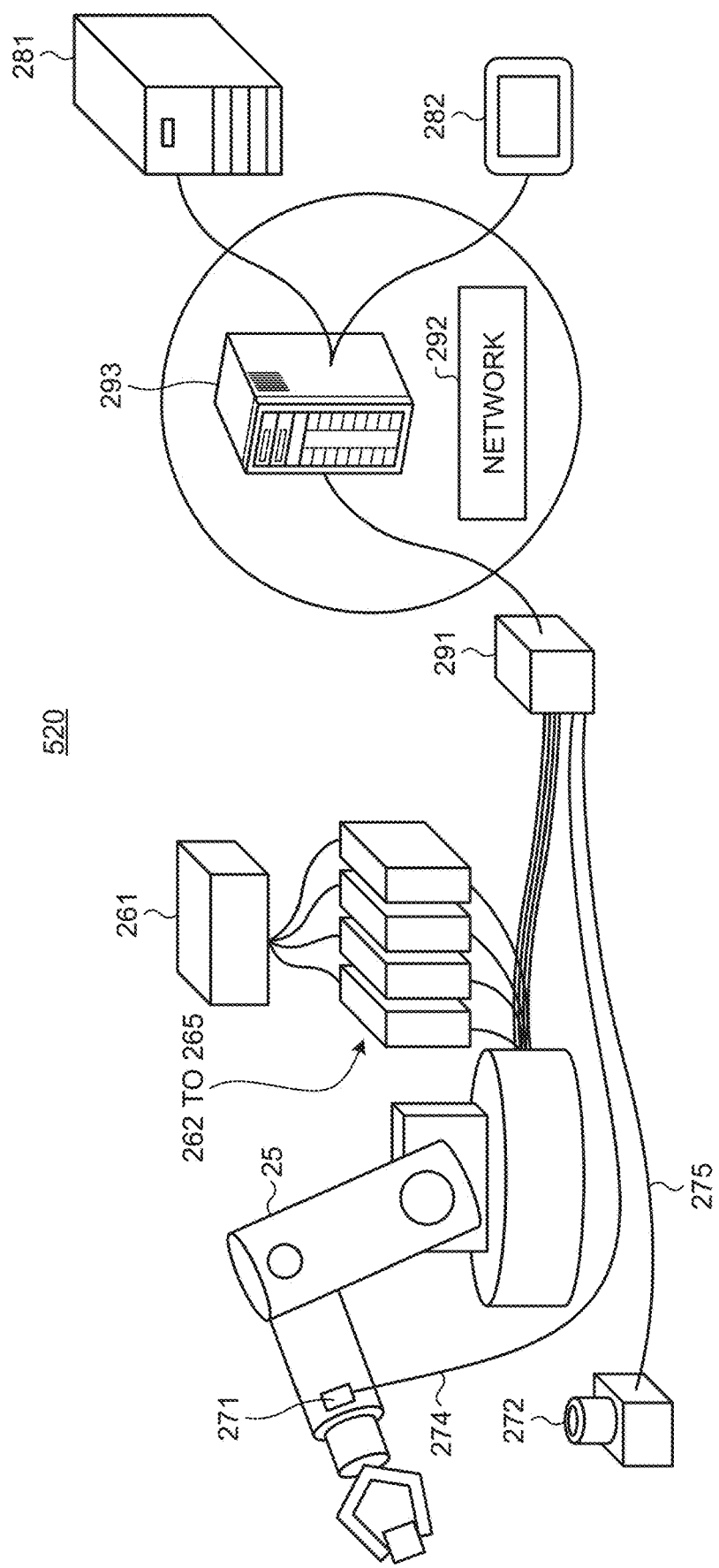
FIG. 12 is a view illustrating an example configuration of a data analysis system including a data analysis device having a function of the synchronization device according to the second embodiment.

FIG. 12 is a view illustrating an example configuration of a data analysis system 520 including a data analysis device 281 having a function of the synchronization device 2 according to the second embodiment. In FIG. 12, the data analysis system 520 includes a four-axis robot 25, a controller 261, servo drives 262 to 265, an acceleration sensor 271, a camera 272, a logger 291, a database server 293, the data analysis device 281, and a visualization terminal 282. The data analysis device 281 and the visualization terminal 282 are connected to the logger 291 via the database server 293. The database server 293 may be a cloud server arranged in a network 29.

The four-axis robot 25 is a device that performs work based on a command from the controller 261. The four-axis robot 25 includes four motors (not illustrated) that drive respective axes of the four axes, and mechanical elements that transmit power to the respective axes. Although an actual four-axis robot includes many arts, FIG. 12 illustrates only some components for simplicity of description.

The controller 261 is connected to the four-axis robot 25 through servo drives 262 to 265, and integrally controls driving of the four-axis robot 25. The controller 261 manages the first time information described above. In addition, the controller 261 has a role of giving a command to an axis in need thereof on the basis of the first time information to thereby driving the four-axis robot 25 in an operation intended by a commander.

The servo drives 262 to 265 are connected correspondingly to respective motors of the four-axis robot 25, and in accordance with a command of the controller 261, generate electric signals serving as commands for driving the four-axis robot 25 and apply the electric signals to the motors of respective axes.

The acceleration sensor 271 is attached to a movable portion of an arm of the four-axis robot 25, and measures, in time series, vibration generated in the four-axis robot 25 by driving of the motors of respective axes. As the acceleration sensor 271, a three-axis acceleration sensor can be used.

The camera 272 is an industrial camera that acquires an operation of the four-axis robot 25 by intermittently or continuously capturing the four-axis robot 25. The camera 272 manages the second time information described above. The camera 272 captures an operation of the four-axis robot 25 together with an operational sound thereof on the basis of the second time information, and stores captured image data and sound data as moving image data. The moving image data is transmitted to the rugger 291.

The logger 291 is connected to the acceleration sensor 271 via a cable 274, and is connected to the camera 272 via a cable 275. The logger 291 manages third time information. The logger 291 sequentially or simultaneously accesses the respective devices to be connected, acquires rotational speed data of respective axes in the four-axis robot 25 as machine data together with time information, and transmits the rotational speed data and the time information to the database server 293. In addition, the logger 291 acquires a measurement value of the acceleration sensor 271 and the moving image data of the camera 272 as measurement data together with time information of the data, and transmits the data and the time information to the database server 293.

In the configuration of FIG. 12, the acceleration sensor 271 does not have time information. Therefore, the logger 291 attaches the third time information to the measurement data of the acceleration sensor 271, and transmits the measurement data with the attached third time information to the database server 293.

The database server 293 stores the machine data acquired by the logger 291 in the database together with the measurement data including the time information attached thereto. An example of the database server 293 is a relational database management system (RDEMS), and another example of the database server 293 is a not only structured query language (SQL). When storing the data, the database server 293 stores the data together with fourth time information managed by the database server 293.

Figure 13:
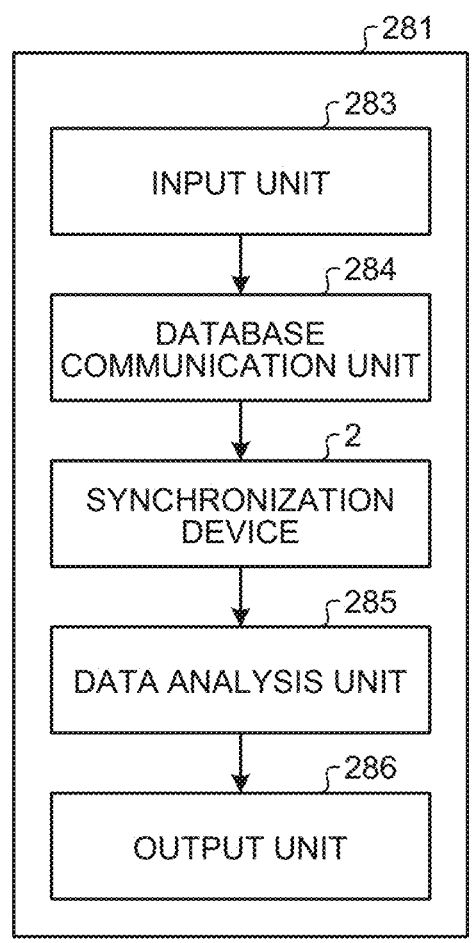
FIG. 13 is a block diagram illustrating an example of a functional configuration of the data analysis device illustrated in FIG. 12.

The data analysis device 281 is a device that analyzes a state of the four-axis robot 25 using data on the four-axis robot 25 accumulated in the database to perform learning. FIG. 13 is a block diagram illustrating an example of a functional configuration of the data analysis device 281 illustrated in FIG. 12. The data analysis device 281 includes an input unit 283, a database communication unit 284, the synchronization device 2, a data analysis unit 285, and an output unit 286.

The input unit 283 acquires machine data and measurement data to be subjected to data analysis. The machine data and the measurement data to be subjected to data analysis are set by the user via the input unit 283. At that time, a range of acquisition time of data may be set in addition to the type of data to be analyzed. By designating the acquisition time of data, the amount of data to be analyzed can be reduced. As a result, a processing time can be reduced.

The database communication unit 284 makes an inquiry to the database server 293 using a means such as SQL with respect to the machine data and the measurement data to be analyzed, and acquires necessary pieces of data. In a case where the range of the acquisition time of data is set, pieces of data to be analyzed are acquired on the basis of the fourth time information managed by the database server 293. The database server 293 can appropriately select pieces of data by attaching time information common to all pieces of data. In a case where the range of the acquisition time is set, data may be acquired by setting a range larger than a range of the designated time. Consequently, even in a case where a part of any data is lost due to the correlation time difference obtained at the time of the synchronization process, if the range of the acquisition time is set in anticipation of such a case, data including the range of the designated acquisition time with no missing pieces can be provided to the user.

The synchronization device 2 can perform a synchronization process by combining each of the rotational speed data based on the first time information, the moving image data based on the second time information, and the acceleration data based on the third time information. Here, in a case where synchronization is performed using the rotational speed data based on the first time information as the machine data, regarding the machine data at the time $t_0$, $\max_{i=1,2,3,4}|\omega_i(t_0)|$ having the maximum absolute value of the rotational speed among the rotational speeds $\omega_1(t_0)$, $\omega_2(t_0)$, $\omega_3(t_0)$, and $\omega_4(t_0)$ of the four axes at the time $t_0$ may be used as the machine data at the time $t_0$. Consequently, for example, when performing a correlation calculation with sound data in moving image data as measurement data, it is possible to prevent an inappropriate correlation evaluation value from being calculated due to the influence of a driving sound generated by an operation of another axis. In general, it is considered that the driving sound is generated when at least one motor is driven. Therefore, by selecting the maximum value among values of the four axes, it is possible to calculate the correlation evaluation value in consideration of the influence of the driving sound generated by an operation of another axis.

The data analysis unit 285 analyzes the operation of the four-axis robot 25 using the synchronized machine data and the synchronized measurement data. The data analysis unit 285 performs a data analysis on the four-axis robot 25 from the viewpoint of anomaly diagnosis or predictive maintenance. For these analyses, an existing method such as machine learning or statistical analysis can be used. A result of the analysis performed by the data analysis unit 285 is output or displayed via the output unit 286.

The visualization terminal 282 is a terminal device for visualizing and displaying the state of the four-axis robot 25. Examples of the visualization terminal 282 include a display, a smartphone, a tablet terminal, and a laptop computer. The visualization terminal 282 displays the state of the four-axis robot 25 using data on the four-axis robot 25 accumulated in the database server 293 and an analysis result of the data analysis device 281.

Figure 14:
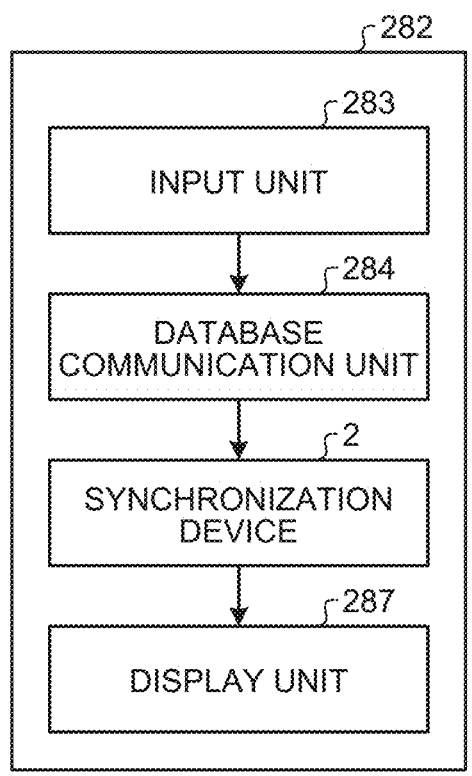
FIG. 14 is a block diagram illustrating an example of a functional configuration of a visualization terminal according to the second embodiment.

FIG. 14 is a block diagram illustrating an example of a functional configuration of the visualization terminal 282 according to the second embodiment. In FIG. 14, components having functions common to the components illustrated in FIG. 13 are denoted by the same reference numerals as those used in FIG. 13, and redundant descriptions thereof will be omitted.

The visualization terminal 282 includes the input unit 283, the database communication unit 284, the synchronization device 2, and the display unit 287.

The synchronization device 2 acquires the synchronized machine data and the synchronized measurement data stored in the database server 293 via the database communication unit 284. The synchronization device 2 outputs the synchronized machine data and the synchronized measurement data, and the display unit 287 displays the synchronized machine data and the synchronized measurement data output from the synchronization device 2.

Figure 15:
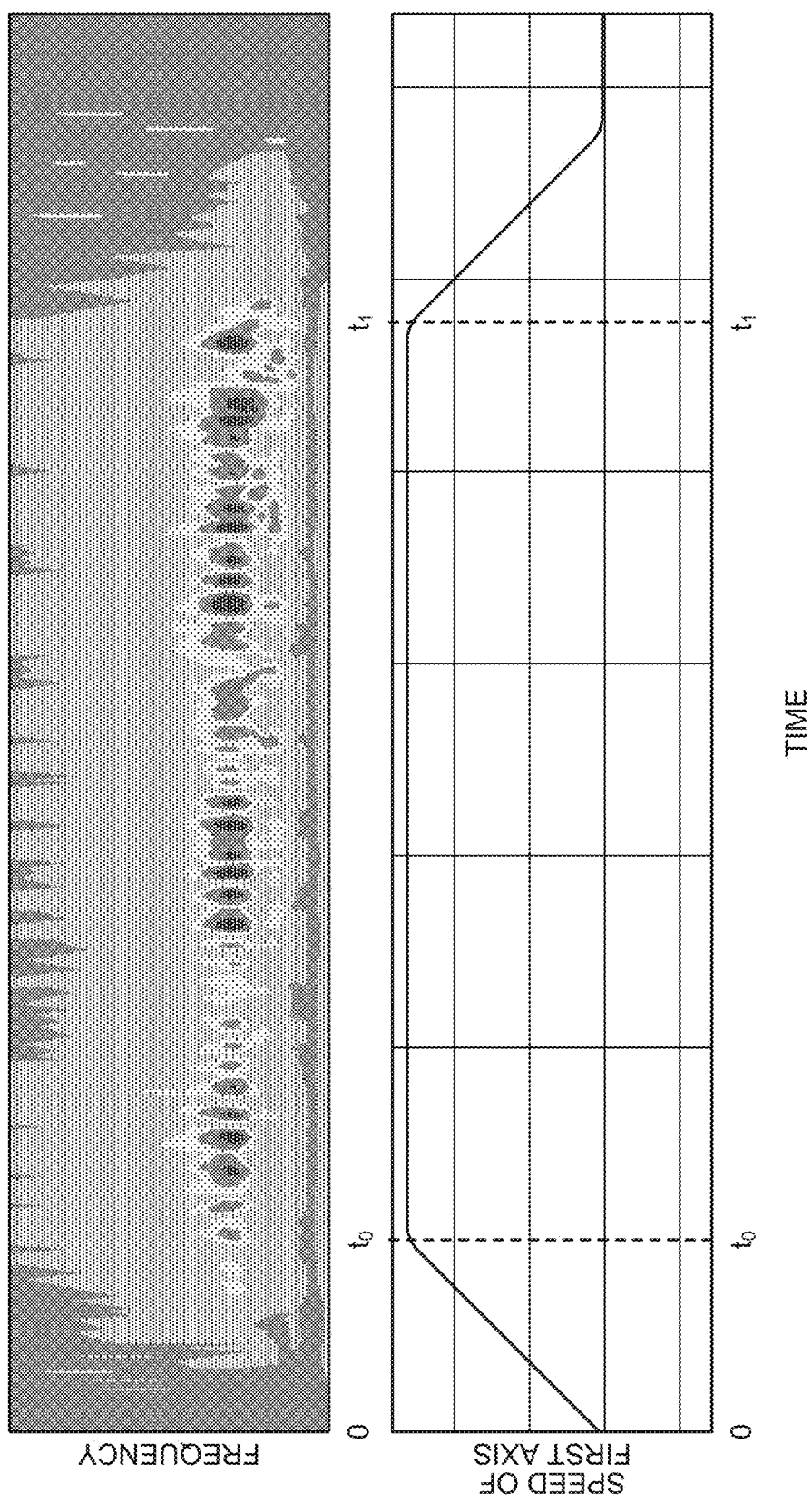
FIG. 15 is a diagram illustrating a display example of the visualization terminal based on an analysis result of the data analysis device in the second embodiment.

FIG. 15 is a diagram illustrating a display example of the visualization terminal 282 based on the analysis result of the data analysis device 281 in the second embodiment. On a lower side of FIG. 15, speed data of a first axis in the four-axis robot 25, which is synchronized machine data, is illustrated. In addition, on an upper side of FIG. 15, a result of frequency transform of the sound data in the moving image data, which is synchronized measurement data, is displayed as a graph. A time 0, the time $t_0$, and the time $t_1$ are times after synchronization, and are times common to the synchronized machine data and the synchronized measurement data. As illustrated In FIG. 15, by the machine data and the measurement data at the same time being displayed in parallel so as to be aligned on a straight line in the same direction, i.e., vertical or horizontal direction, it is possible to present the state of the machine in a more easily understandable manner. In particular, simultaneous display of the machine data and the distribution of the frequency components of the sound data at the same time makes it easy to estimate a factor of an anomalous sound or the like in a case of occurrence thereof.

In the second embodiment, the synchronization device 2 is arranged in the data analysis device 281 or the visualization terminal 282, but may be arranged in the logger 291 or between the logger 291 and the database server 293. In that case, the database server 293 stores the synchronized machine data and measurement data in the database, which eliminates necessity of a synchronization process performed by the data analysis device 281 or the visualization terminal 282, and thus, it is possible to obtain an effect that the load of the process is reduced and a response to an operation of the user becomes faster.

The synchronization device according to the second embodiment performs a frequency transform on at least one of machine data and measurement data to obtain a frequency spectrum of time series, and performs a correlation calculation. As a result, data to be subjected to the correlation calculation can be limited to data on a specific frequency, so that synchronization accuracy can be improved. In particular, by performing the correlation calculation with a frequency representing an operation of a machine, for example, a resonance frequency or a mechanical device, it is possible to perform a synchronization process with higher accuracy.

In addition, the synchronization device according to the second embodiment performs an envelope process when performing the frequency transform. As a result, it is possible to reduce the influence of an error of the measurement data when performing the correlation calculation.

Furthermore, the synchronization device according to the second embodiment can synchronize moving image data with measurement values of the acceleration sensor via sound data. As a result, by using a synchronized moving image of a phenomenon that has occurred in the entire device at a time of anomaly of the acceleration sensor, the user can easily know the phenomenon that has occurred.

The data analysis device according to the second embodiment stores the rotational speed data of the four axes, measurement values of the acceleration sensor installed on the arm, and the moving image data during the driving in the database server together with respective pieces of time information thereof. As a result, a configuration for time synchronization of the states of the four-axis robot is no longer needed, and drive data can be accumulated with a simpler configuration. In particular, a data accumulation environment can be easily introduced into an existing facility.

In addition, the data analysis device according to the second embodiment can synchronize the machine data with the measurement data by the synchronization devices provided in the analysis device and the visualization terminal. As a result, when using the database for an analysis, visualization, and the like, the analysis and the visualization can be performed on the basis of highly accurate data. For example, the user can get an overview of data by using an existing method of integrating and displaying data accumulated in the database. At that time, with the USA of the synchronized machine data and the synchronized measurement data, a clearer causal relationship is obtained regarding a phenomenon occurring due to a combination of respective pieces of data. In addition, the user can perform an analysis, learning, and the like on the data accumulated in the database. At that time, the use of synchronized data makes it possible to incorporate the causal relationship of the phenomenon occurring due to a combination of data into the analysis and the learning, and thus to obtain a more accurate result.

Third Embodiment

Figure 16:
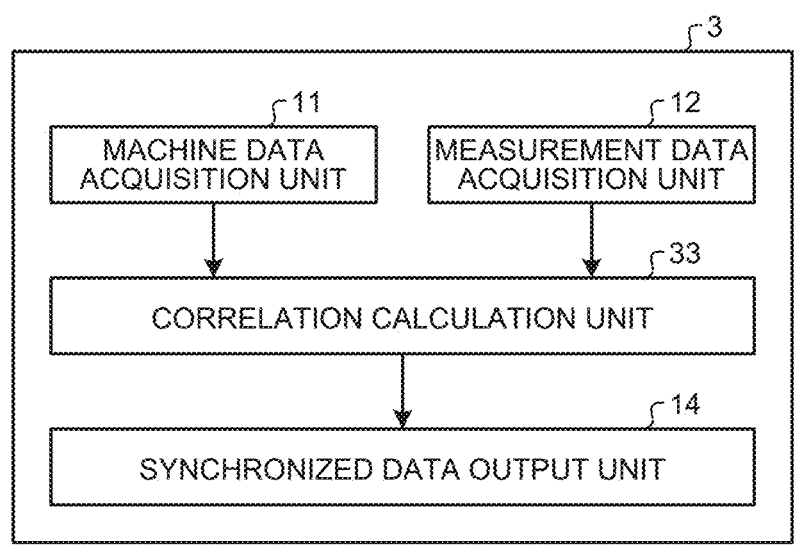
FIG. 16 is a block diagram illustrating an example of a functional configuration of a synchronization device according to a third embodiment.

FIG. 16 is a block diagram illustrating an example of a functional configuration of a synchronization device 3 according to a third embodiment. As compared with the configuration of the synchronization device 1 according to the first embodiment illustrated in FIG. 1, in the synchronization device 3 according to the third embodiment, the correlation calculation unit 13 is replaced with a correlation calculation unit 33. In the third embodiment, similarly to the second embodiment, a temporal change in a frequency spectrum is used as data to be synchronized. Therefore, the correlation calculation unit 33 calculates a correlation after performing a frequency transform on the data. In addition, the correlation calculation unit 33 automatically calculates a frequency used for a correlation calculation by peak extraction. Other components are the same as or equivalent to those illustrated in FIG. 1. The same or equivalent components are denoted by the same reference numerals as those in FIG. 1, and redundant descriptions thereof will be omitted.

Figure 17:
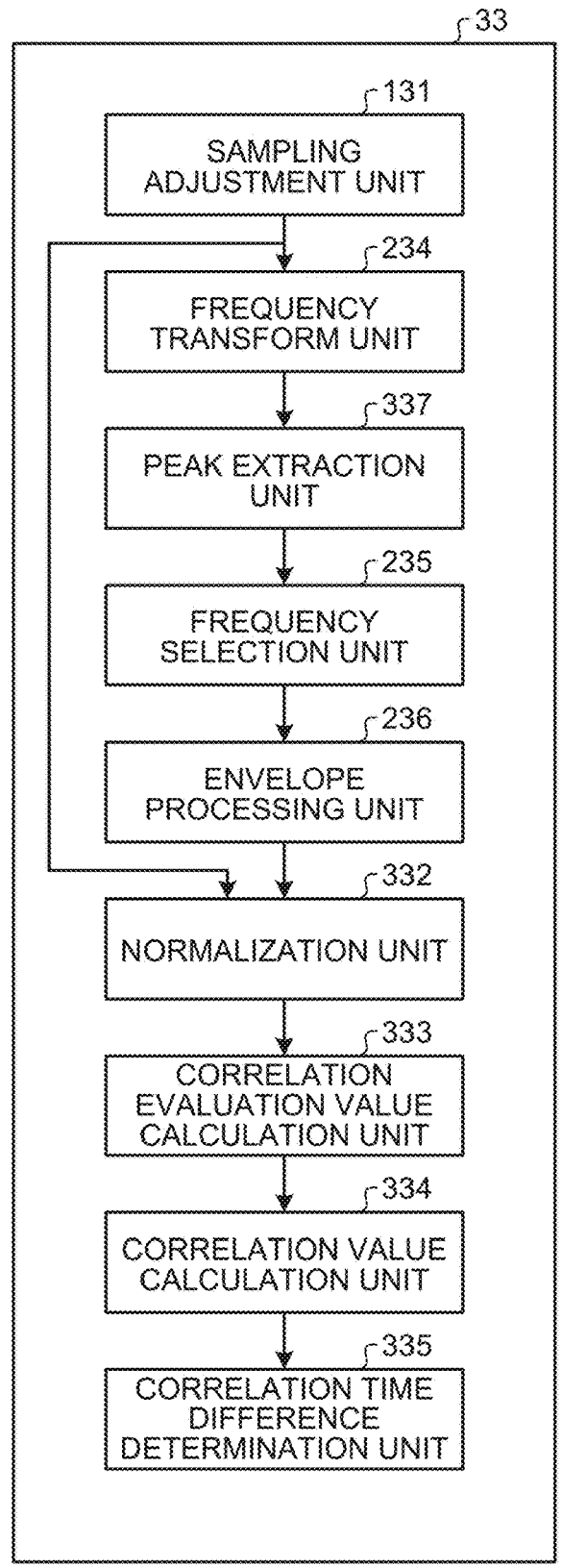
FIG. 17 is a block diagram illustrating an example of a functional configuration of a correlation calculation unit in the third embodiment.

FIG. 17 is a block diagram illustrating an example of a functional configuration of the correlation calculation unit 33 in the third embodiment. As compared with the configuration of the correlation calculation unit 23 in the second embodiment illustrated in FIG. 11, in the correlation calculation unit 33 in the third embodiment, a peak extraction unit 337 is provided between the frequency transform unit 234 and the frequency selection unit 235. In addition, the normalization unit 132 is replaced with a normalization unit 332, the correlation evaluation value calculation unit 133 is replaced with a correlation evaluation value calculation unit 333, the correlation value calculation unit 134 is replaced with a correlation value calculation unit 334, and the correlation time difference determination unit 135 is replaced with a correlation time difference determination unit 335. Other components are the same as or equivalent to those illustrated in FIG. 11. The same or equivalent components are denoted by the same reference numerals as those in FIG. 11, and redundant descriptions thereof will be omitted.

In FIG. 17, with respect to machine data or measurement data to be subjected to the frequency the peak extraction unit 337 extracts one or more frequencies at which a frequency spectrum peaks. Here, this frequency is referred to as a "peak frequency". As for the peak frequency, a frequency spectrum of time series which is a result of a transform performed by the frequency transform unit 234 is averaged in a time direction, and viewed as average power for each frequency, and a frequency at which such average power peaks is usable as the peak frequency. Alternatively, a peak of a frequency spectrum calculated by performing a fast Fourier transform (FFT) process on the entire data may be calculated as the peak frequency. In a case where the results of the frequency transform unit 234 are not used when the peak frequency is calculated, the process by the peak extraction unit 337 and the process by the frequency transform unit 234 may be performed in reverse order.

The normalization unit 332 normalizes the machine data and the measurement data adjusted to have the same sampling period similarly to the normalization unit 132. However, in a case where two or more frequencies are extracted by the peak extraction unit 337, another coefficient is multiplied for each frequency so as to make all scales constant.

The correlation evaluation value calculation unit 333 and the correlation value calculation unit 334 calculate a correlation evaluation value and a correlation value similarly to the correlation evaluation value calculation unit 133 and the correlation value calculation unit 134. The correlation time difference determination unit 335 determines a correlation time difference similarly to the correlation time difference determination unit 135. However, in a case where two or more frequencies are designated by the peak extraction unit 337, the correlation evaluation value calculation unit 333 calculates a correlation evaluation value sequence for each frequency. The correlation value calculation unit 334 calculates, as a correlation value, a correlation evaluation value having the maximum correlation strength among correlation evaluation values of all frequencies. Then, the correlation time difference determination unit 335 determines a time difference corresponding to the correlation value as a correlation time difference.

The frequency selected by the peak extraction unit 337 or the frequency selection unit 235 may be stored in a memory of the synchronization device 3. As a result, by selecting the frequency stored in the memory in a second and subsequent processes, the processes performed by the peak extraction unit 337 and the frequency selection unit 235 can be skipped.

Figure 18:
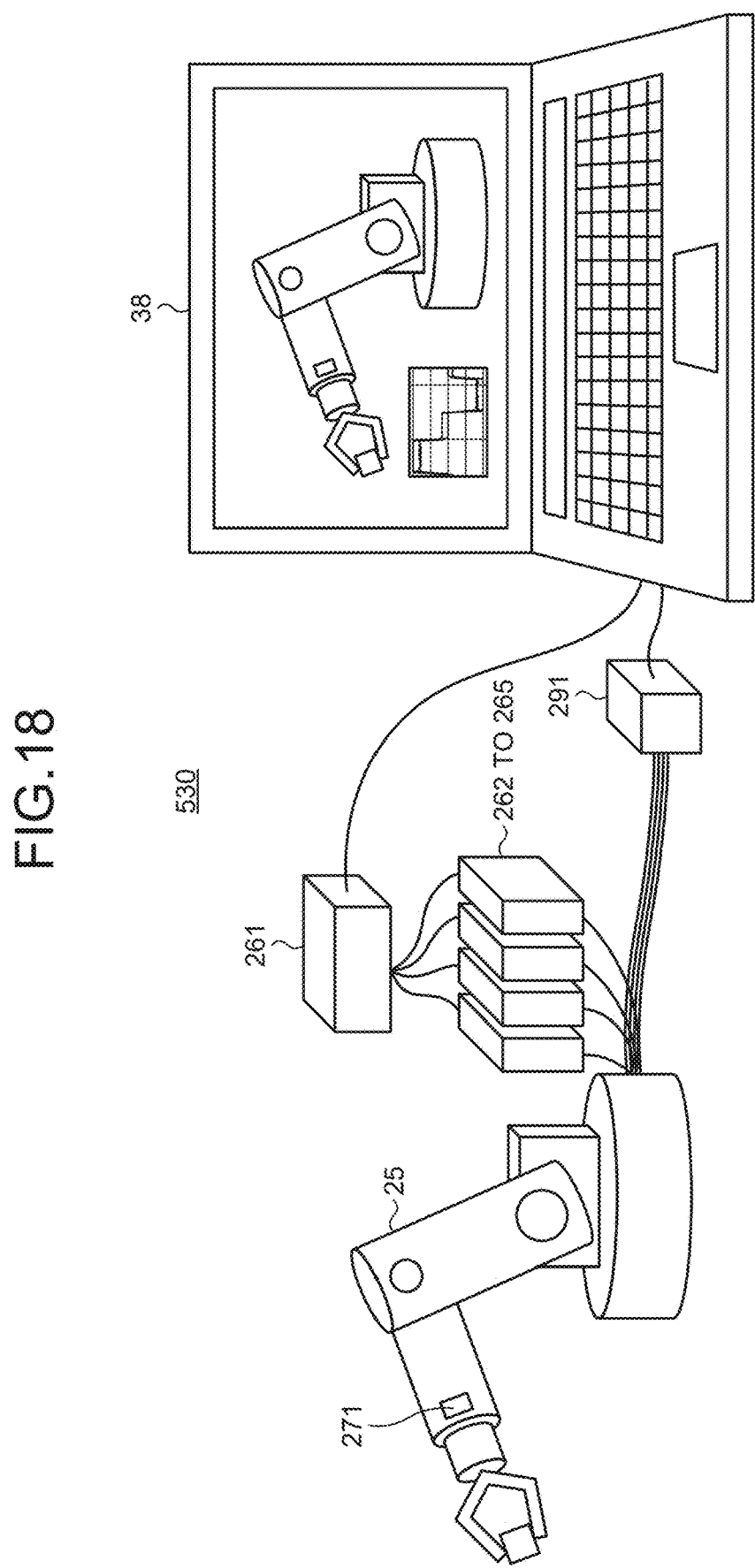
FIG. 18 is a view illustrating an example configuration of a simulation system including a simulation terminal having a function of the synchronization device according to the third embodiment.

FIG. 18 is a view illustrating an example configuration of a simulation system 530 including a simulation terminal 38 having a function of the synchronization device 3 according to the third embodiment. In FIG. 18, components having functions common to any of the components illustrated in FIG. 12 are denoted by the same reference numerals as those used in FIG. 12, and redundant descriptions thereof will be omitted.

In FIG. 18, the simulation system 530 includes the four-axis robot 25, the controller 261, the servo drives 262 to 265, the acceleration sensor 271, the logger 291, and the simulation terminal 38.

The simulation terminal 38 is connected to the controller 261 and the logger 291. The simulation terminal 38 is a terminal device that performs a drive simulation on the four-axis robot 25. The drive simulation can be performed on the basis of command data and operation data such as a position, a rotational speed, and a current value of each motor of the four-axis robot 25 based on the first time information, and acceleration data of the four-axis robot 25 based on the third time information. The command data or the operation data such as a position, a rotational speed, and a current value of each motor is acquired from the controller 261. The acceleration data of the four-axis robot 25 is acquired from the logger 291. As the simulation terminal 38, a display, a smartphone, a tablet terminal, or a laptop computer can be used.

Figure 19:
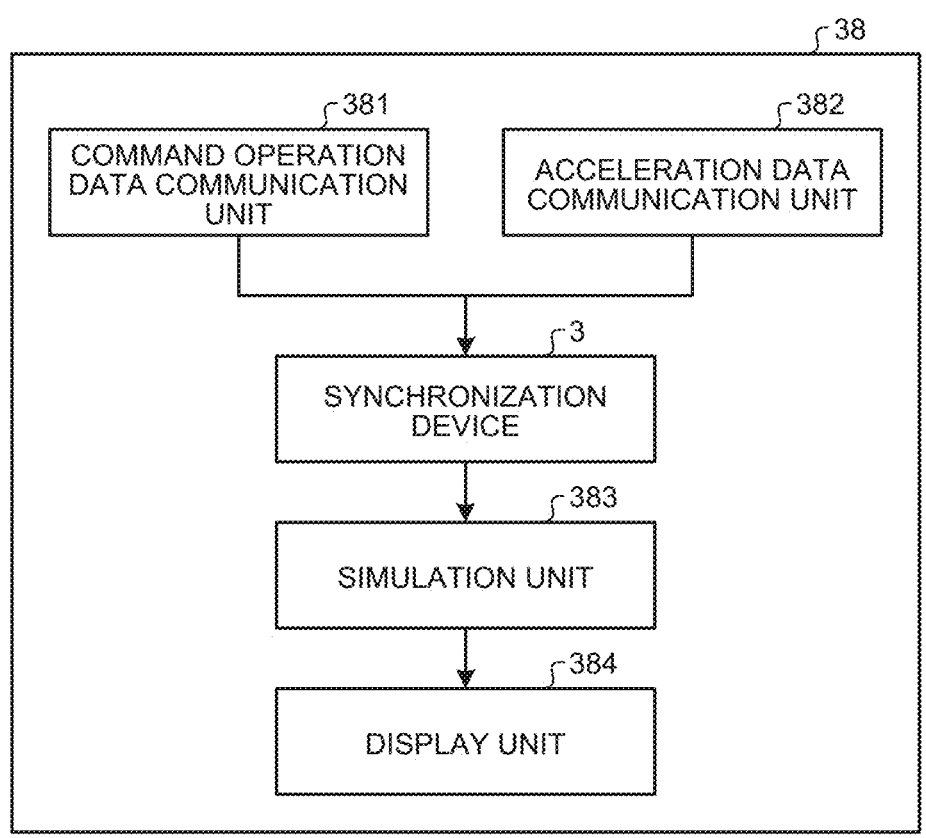
FIG. 19 is a block diagram illustrating an example of a functional configuration of the simulation terminal according to the third embodiment.

FIG. 19 is a block diagram illustrating an example of a functional configuration of the simulation terminal 38 according to the third embodiment. In FIG. 19, the simulation terminal 38 includes a command operation data communication unit 381, an acceleration data communication unit 382, the synchronization device 3, a simulation unit 383, and a display unit 384.

In the simulation terminal 38, the synchronization device 3 performs a correlation calculation between command data or operation data representing an operation of a machine and acceleration data representing a state of the machine to thereby perform a synchronization process. The simulation unit 383 performs a drive simulation of the four-axis robot 25 using synchronized machine data and synchronized measurement data output from the synchronization device 3. A result of the simulation by the simulation unit 383 is displayed to the user by the display unit 384.

The synchronization device according to the third embodiment extracts one or more frequencies at which the frequencies peak, normalizes the extracted frequencies so that scales are the same, and then calculates a correlation time difference at which correlation strength is maximum. As a result, for example, even for a device of which a peak frequency of a driving sound generated by mechanical resonance or the like is unknown, it is possible to perform a highly accurate synchronization process between machine data and sound data without designating a frequency. In a case where a peak is calculated for a device with an unknown peak frequency, when FFT or the like is used to obtain a peak for a sound in a certain section, a peak frequency may be erroneously detected due to stationary noise such as a sound of a surrounding device, which is a problem. In order to address the problem, the synchronization device according to the third embodiment extracts one or more frequencies at which the frequency spectrums peak, and performs a correlation calculation between extracted frequency data and machine data representing an operation of a machine. As a result, surrounding noise irrelevant to the operation of the machine can be eliminated, and thus the peak frequency of the driving sound can be reliably obtained.

In addition, the simulation terminal according to the third embodiment can synchronously input command data and operation data acquired from the controller and acceleration data acquired by the acceleration sensor to the simulation. As a result, an estimated value of the acceleration sensor obtained by the simulation can be compared with an actually measured value, and a simulation model can be validated. Since the simulation model can be validated, it is possible to easily update the simulation model to the latest state. When performing the validation and the update, a data synchronization process is performed by the synchronization device, so that the simulation unit is only required to perform a simulation excluding the synchronization process. As a result, it is possible to perform an accurate simulation with a simpler device. In addition, in a case where a function of digital twin is realized by the simulation terminal, it is also possible to easily perform validation of the digital twin.

The configurations described in the above embodiments are merely examples and can be combined with other known technology, the embodiments can be combined with each other, and part of the configurations can be omitted or modified without departing from the gist thereof.

REFERENCE SIGNS LIST 1, 2, 3 synchronization device; 10 synchronization unit; 11 machine data acquisition unit; 12 measurement data acquisition unit; 13, 23, 33 correlation calculation unit; 14 synchronized data output unit; 15 blower; 15a impeller; 15b motor; 16 control device; 18 inspection terminal; 19a, 19b, 274, 275 cable; 21 cable connector; 25 four-axis robot; 38 simulation terminal; 131 sampling adjustment unit; 132, 332 normalization unit; 133, 333 correlation evaluation value calculation unit; 134, 334 correlation value calculation unit; 135, 335 correlation time difference determination unit; 161, 181 control unit; 162 motor drive unit; 182 storage unit; 183 monitor; 184 anomaly diagnosis unit; 185, 287, 384 display unit; 186 machine data communication unit; 187 measurement data communication unit; 234 frequency transform unit; 235 frequency selection unit; 236 envelope processing unit; 261 controller; 262 to 265 servo drive; 271 acceleration sensor; 272 camera; 281 data analysis device; 282 visualization terminal; 283 input unit; 284 database communication unit; 285 data analysis unit; 286 output unit; 291 logger; 292 network; 293 database server; 337 peak extraction unit; 381 command operation data communication unit; 382 acceleration data communication unit; 383 simulation unit; 500 drive system; 510 drive device; 520 data analysis system; 530 simulation system.

The invention claimed is:
1. A synchronization device comprising:
machine data acquisition circuitry to acquire, as machine data, time-series information regarding driving of a machine that is information acquired at a time indicated by first time information;
measurement data acquisition circuitry to acquire, as measurement data, time-series information regarding a state of the machine that is information including a magnitude of a sound or vibration and acquired at a time indicated by second time information that is different from the first time information;
correlation calculation circuitry to calculate a correlation time difference that is a time difference when strength of correlation between an absolute value of the machine data and a frequency component of the measurement data is maximum on a basis of the machine data, the measurement data, and a time difference when any one of the machine data and the measurement data is staggered in a positive or negative direction of a time axis; and
synchronized data output circuitry to output, as synchronized machine data, the machine data synchronized with the measurement data on a basis of the correlation time difference, and to output, as synchronized measurement data, the measurement data synchronized with the machine data on a basis of the correlation time difference, wherein
the correlation calculation circuitry includes peak extraction circuitry to obtain a frequency at which a frequency spectrum of the measurement data peaks from the measurement data, and
the strength of correlation is calculated on a basis of a temporal change in a frequency component at which the frequency spectrum of the measurement data peaks, and the machine data.

2. The synchronization device according to claim 1, wherein
the correlation calculation circuitry includes normalization circuitry to normalize the machine data and the measurement data used for calculation of correlation value.

3. The synchronization device according to claim 1, wherein
the machine is a machine driven by a motor.

4. The synchronization device according to claim 1, wherein
the machine is a machine driven by a motor, and
the machine data is data about an angle of rotation, a speed, a current, or a force of the motor.

5. A non-transitory computer-readable storage medium storing a program that causes a computer to implement a function of the synchronization device according to claim 1.

6. The synchronization device according to claim 2, wherein
the machine is a machine driven by a motor, and
the machine data is data about an angle of rotation, a speed, a current, or a force of the motor.

7. The synchronization device according to claim 1, wherein
the machine is a machine driven by a motor, and
the machine data is data about an angle of rotation, a speed, a current, or a force of the motor.

8. A non-transitory computer-readable storage medium storing a program that causes a computer to implement a function of the synchronization device according to claim 2.

9. A non-transitory computer-readable storage medium storing a program that causes a computer to implement a function of the synchronization device according to claim 1.

10. A non-transitory computer-readable storage medium storing a program that causes a computer to implement a function of the synchronization device according to claim 3.

11. A non-transitory computer-readable storage medium storing a program that causes a computer to implement a function of the synchronization device according to claim 4.

12. A non-transitory computer-readable storage medium storing a program that causes a computer to implement a function of the synchronization device according to claim 6.

13. A non-transitory computer-readable storage medium storing a program that causes a computer to implement a function of the synchronization device according to claim 7.

14. A non-transitory computer-readable storage medium storing a program which causes a computer to execute process procedures including:
   acquiring, as machine data, time-series information regarding driving of a machine that is information acquired at a time indicated by first time information;
   acquiring, as measurement data, time-series information regarding a state of the machine that is information including a magnitude of a sound or vibration and acquired at a time indicated by second time information that is different from the first time information;
   calculating a correlation value having maximum correlation strength between an absolute value of the machine data and a frequency component of the measurement data on a basis of the machine data, the measurement data, and a time difference when any one of the machine data and the measurement data is staggered in a positive or negative direction of a time axis;
   calculating a correlation time difference that is a time difference when the correlation value is obtained;
   determining, as synchronized machine data, the machine data synchronized with the measurement data on a basis of the correlation time difference, and determining, as synchronized measurement data, the measurement data synchronized with the machine data on a basis of the correlation time difference;
   obtaining a frequency at which a frequency spectrum of the measurement data peaks from the measurement data; and
   calculating the strength of correlation on a basis of a temporal change in a frequency component at which the frequency spectrum of the measurement data peaks, and the machine data.

\* \* \* \* \*